United States Patent
Gross et al.

(10) Patent No.: US 6,782,324 B2
(45) Date of Patent: Aug. 24, 2004

(54) METHOD AND APPARATUS FOR USING ACOUSTIC SIGNALS TO IDENTIFY ONE OR MORE DISC DRIVES THAT ARE LIKELY TO FAIL

(75) Inventors: Kenny C. Gross, San Diego, CA (US); Wendy Lu, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/317,350

(22) Filed: Dec. 12, 2002

(65) Prior Publication Data

US 2004/0034482 A1 Feb. 19, 2004

Related U.S. Application Data

(63) Continuation-in-part of application No. 10/222,611, filed on Aug. 16, 2002.

(51) Int. Cl.[7] .............................. G01B 3/44; G01B 3/52
(52) U.S. Cl. ...................................................... 702/34
(58) Field of Search .............................. 702/39, 33, 34; 714/42, 47, 48

(56) References Cited

U.S. PATENT DOCUMENTS

| | | | | |
|---|---|---|---|---|
| 5,909,661 A | * | 6/1999 | Abramovitch et al. | ...... 702/191 |
| 6,249,890 B1 | * | 6/2001 | Ukani et al. | ............... 714/721 |
| 6,359,433 B1 | * | 3/2002 | Gillis et al. | ................ 324/210 |
| 6,415,189 B1 | * | 7/2002 | Hajji | ........................... 700/79 |
| 6,665,633 B2 | * | 12/2003 | Fioravanti et al. | ......... 702/182 |
| 2003/0065495 A1 | * | 4/2003 | Lee et al. | ...................... 703/6 |

OTHER PUBLICATIONS

Publication entitled "Barycentric–Coordinates Technique for Identification of Simultaneous Fuel Failures with Gas Tagging," by Kenny C. Gross, Nuclear Technology, vol. 75, Sep. 1980, pp. 1–11.

* cited by examiner

Primary Examiner—John Barlow
Assistant Examiner—Demetrius Pretlow
(74) Attorney, Agent, or Firm—Park, Vaughan & Fleming LLP (57) ABSTRACT

One embodiment of the present invention provides a system that facilitates determining whether a disk drive is likely to fail. The system operates by monitoring at least three acoustic signals emitted from a two-dimensional array of disk drives and then comparing characteristics of each acoustic signal with baseline acoustic signals. These baseline acoustic signals reflect normal operation of the two-dimensional array of disk drives. If the acoustic signals differ by a predetermined amount from the baseline acoustic signals, the system identifies one or more disk drives in the two-dimensional array of disk drives that are likely to fail.

24 Claims, 6 Drawing Sheets

METHOD AND APPARATUS FOR USING ACOUSTIC SIGNALS TO IDENTIFY ONE OR MORE DISC DRIVES THAT ARE LIKELY TO FAIL

RELATED APPLICATION

This application is a continuation-in-part of a pending U.S. patent application, entitled "Method and Apparatus for using Acoustic Signals To Identify Disk Drives That Are Likely To Fail," by inventors Kenny C. Gross and Wendy Lu, Ser. No. 10/222,611, filed Aug. 16, 2002. This application hereby claims priority under 35 U.S.C. § 120 to the above-listed patent application.

BACKGROUND

1. Field of the Invention

The present invention relates to systems for providing fault-tolerance for disk drives in computer systems. More specifically, the present invention relates to a method and an apparatus for using acoustic signals to identify one or more disk drives that are likely to fail in a computer system.

2. Related Art

As computer systems grow increasingly more powerful, they are able to manipulate larger volumes of data and are able to execute larger and more sophisticated computer programs. In order to accommodate these larger volumes of data and larger programs, computer systems are using larger amounts of disk storage. For example, some existing server systems currently support more than 15,000 disk drives.

Ensuring the reliability of disk storage in these systems is critically important for most applications. Allowing data to be corrupted or lost can have a devastating effect on businesses that rely on the data. For example, airlines rely on the integrity of data stored in their reservation systems for most of their day-to-day operations, and would essentially cease to function if this data became lost or corrupted.

About one percent of disk drives within a computer system fail each year. This has motivated system designers to develop techniques to mitigate the loss of data caused by disk drive failures. For example, disk drives are often organized into "RAID" arrays to ameliorate the effects of a drive failure by providing data redundancy.

Although these redundancy-based techniques can help prevent the loss of data, a failed disk drive must be replaced quickly to maintain system reliability. If a second disk drive fails before the first failed disk drive can be replaced, data can be lost.

Note that disk drives can fail in a number of ways. A failure in the electrical circuitry of a disk drive is typically instantaneous and catastrophic. On the other hand, more common mechanical failures often develop over an extended period of time. For example, one of the most common disk drive failures is a failure of a spindle bearing. Spindle bearing failures typically take place over an extended period of time as frictional forces gradually wear away at the spindle bearing. In many cases, a spindle bearing can change from being fully functional to completely failed over several hours, or even days.

Some software techniques attempt to detect incipient failures by analyzing read/write errors and retry attempts. While these techniques can be effective in some situations, a disk drive needs to be very close to failure before the software can detect the impending failure. This leaves very little time to replace the failing disk drive.

What is needed is a method and an apparatus for identifying disk drives that are likely to fail without the problems described above.

SUMMARY

One embodiment of the present invention provides a system that facilitates determining whether a disk drive is likely to fail. The system operates by monitoring at least three acoustic signals emitted from a two-dimensional array of disk drives and then comparing characteristics of each acoustic signal with baseline acoustic signals. These baseline acoustic signals reflect normal operation of the two-dimensional array of disk drives. If the acoustic signals differ by a predetermined amount from the baseline acoustic signals, the system identifies one or more disk drives in the two-dimensional array of disk drives that are likely to fail.

In a variation of this embodiment, monitoring the acoustic signals involves monitoring signals from microphones arranged non-linearly on a periphery of the two-dimensional array of disk drives.

In a further variation, comparing characteristics of each acoustic signal with baseline acoustic signals involves calculating a power spectral density for each acoustic signal and then subtracting the baseline power spectral density from the power spectral density for each acoustic signal. It can also involve subtracting the power spectral density from the baseline power spectral density for each acoustic signal.

In a further variation, calculating the power spectral density involves performing a Fourier transform on each acoustic signal.

In a further variation, the system limits the frequency range of the power spectral density to a predetermined frequency range that is associated with failing disk drives.

In a further variation, identifying that one or more disk drives is likely to fail involves correlating the acoustic signals to determine one or more disk drives within the two-dimensional array of disk drives that may fail.

In a further variation, correlating the acoustic signals involves localizing failing disk drives by applying a barycentric coordinate technique to the acoustic signals.

In a further variation, the system monitors at least four acoustic signals emitted from a three-dimensional array of disk drives and compares characteristics of each acoustic signal with baseline acoustic signals. These baseline acoustic signals reflect normal operation of the three-dimensional array of disk drives. If the acoustic signals differ by the predetermined amount from the baseline acoustic signals, the system identifies one or more disk drives in the three-dimensional array of disk drives that are likely to fail.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System with a Single Disk Drive

Figure 1:
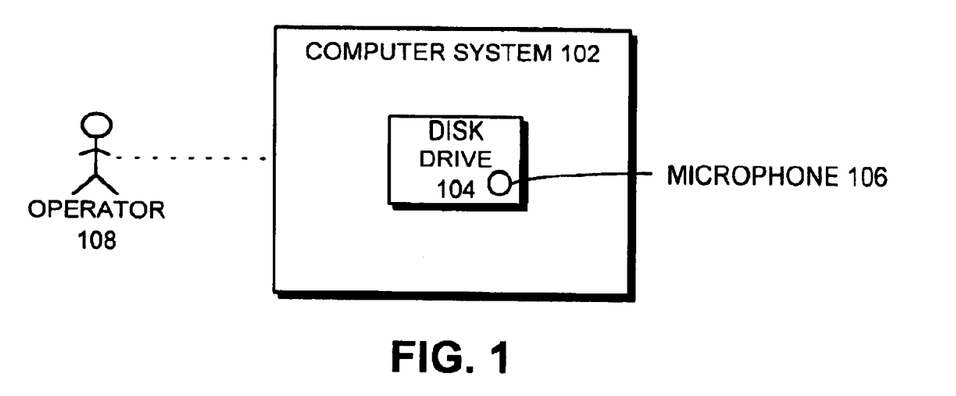
FIG. 1 illustrates a computer system with a single disk drive in accordance with an embodiment of the present invention.

FIG. 1 illustrates a computer system 102 with a single disk drive in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Computer system 102 includes disk drive 104. Disk drive 104 can include any type of non-volatile storage device that can be coupled to a computer system. This includes, but is not limited to, magnetic, optical, and magneto-optical storage devices.

Microphone 106 is acoustically coupled to disk drive 104. During operation, microphone 106 monitors the sounds generated by disk drive 104. The signals representing these sounds are provided to a process within computer system 102 that computes the power spectral density spectrum (PSD) of the signals. This PSD is compared to a baseline PSD to determine if the sounds have changed since the baseline PSD was generated. If the PSD has changed significantly, which possibly indicates that failure of the disk drive is imminent, operator 108 is informed. This process is described in more detail in conjunction with FIG. 4 below.

Computer System with a Linear Array of Disk Drives

Figure 2:
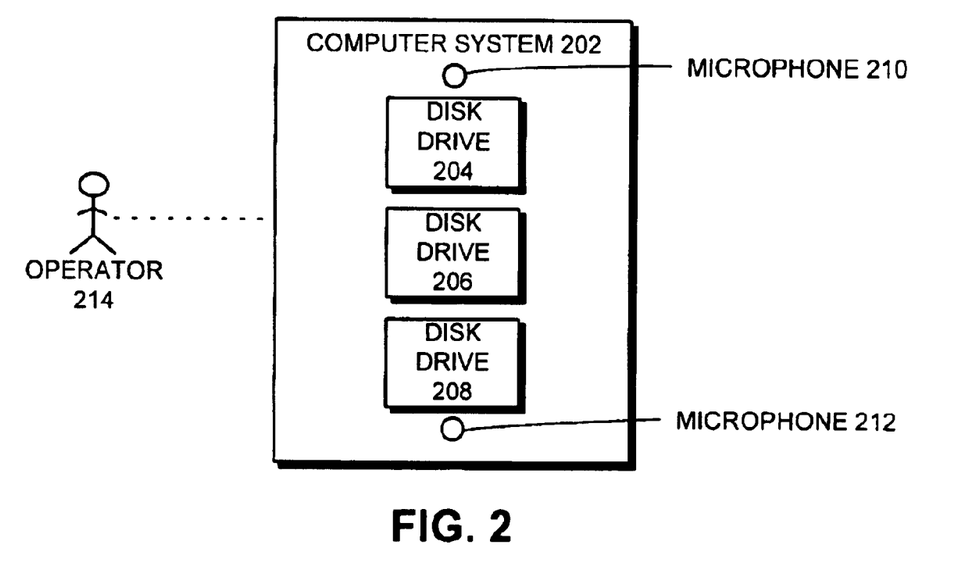
FIG. 2 illustrates a computer system with a linear array of disk drives in accordance with an embodiment of the present invention.

FIG. 2 illustrates a computer system 202 with a linear array of disk drives in accordance with an embodiment of the present invention. Computer system 202 can generally include any type of computer system, including, but not limited to, a computer system based on a microprocessor, a mainframe computer, a digital signal processor, a portable computing device, a personal organizer, a device controller, and a computational engine within an appliance.

Computer system 202 includes disk drives 204, 206, and 208 organized into a linear array. Disk drives 204, 206, and 208 can include any type of non-volatile storage devices that can be coupled to a computer system. This includes, but is not limited to, magnetic, optical, and magneto-optical storage devices. Note that this linear array can include more or fewer drives than is shown in FIG. 2.

Microphones 210 and 212 are acoustically coupled to the linear array of disk drives. Note that microphones 210 and 212 are positioned in different locations relative to the linear array of disk drives. During operation, microphones 210 and 212 monitor the sounds generated by the linear array of disk drives. The signals representing these sounds are provided to a process within computer system 202 that computes the power spectral density (PSD) of each of the signals. This PSD is compared to a baseline PSD for each microphone to determine if the sounds have changed since the baseline PSD was generated. If the PSDs have changed significantly, indicating that failure of a disk drive is likely, the system determines which disk drive is failing and informs operator 214. This process is described in more detail in conjunction with FIG. 4 below.

Server with Two-Dimensional Array of Disk Drives

Figure 3:
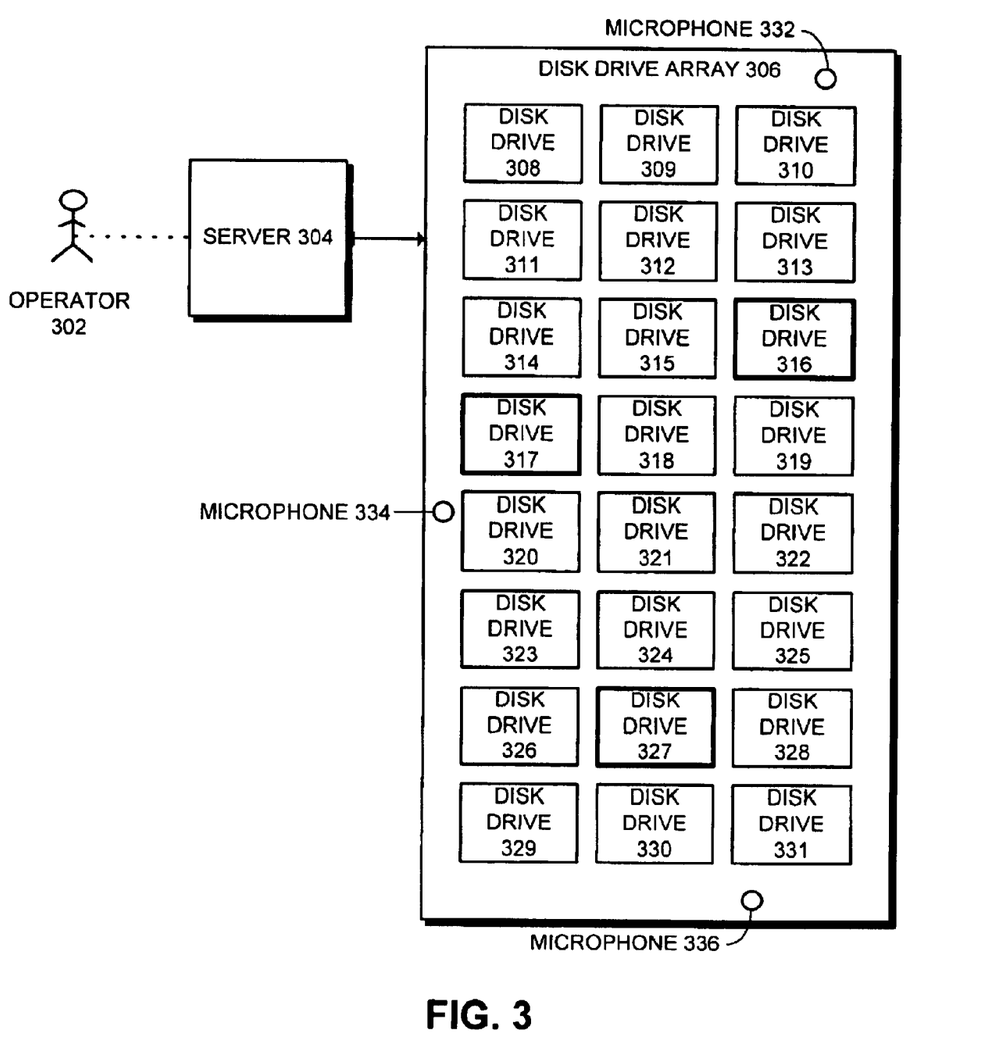
FIG. 3 illustrates a server with a two-dimensional array of disk drives in accordance with an embodiment of the present invention.

FIG. 3 illustrates a server 304 coupled to a two-dimensional disk drive array 306 in accordance with an embodiment of the present invention. Server 304 can generally include any computational node including a mechanism for servicing requests from a client for computational and/or data storage resources. Server 304 is coupled to disk drive array 306.

Disk drive array 306 includes a number of disk drives 308–331 arranged in a two-dimensional array. Disk drives 308–331 can include any type of non-volatile storage devices that can be coupled to a computer system. This includes, but is not limited to, magnetic, optical, and magneto-optical storage devices. Note that disk drive array 306 can include more or fewer drives in the two-dimensional array than are shown in FIG. 3.

Microphones 332, 334, and 336 are acoustically coupled to the two-dimensional array of disk drives. Note that microphones 332, 334, and 336 are located in different, non-collinear locations relative to the two-dimensional array of disk drives. During operation, microphones 332, 334, and 336 monitor sounds generated by the two-dimensional array of disk drives. Signals representing these sounds are provided to a process within server 304 that computes the power spectral density (PSD) of each of the signals. This PSD is compared to a baseline PSD for each microphone to determine if the sounds have changed since the baseline PSD was generated. If any of the PSDs have changed significantly, indicating that failure of a disk drive is imminent, the system determines which disk drive is failing and informs operator 302. This process is described in more detail in conjunction with FIG. 4 below.

Computer System 402

Figure 4:
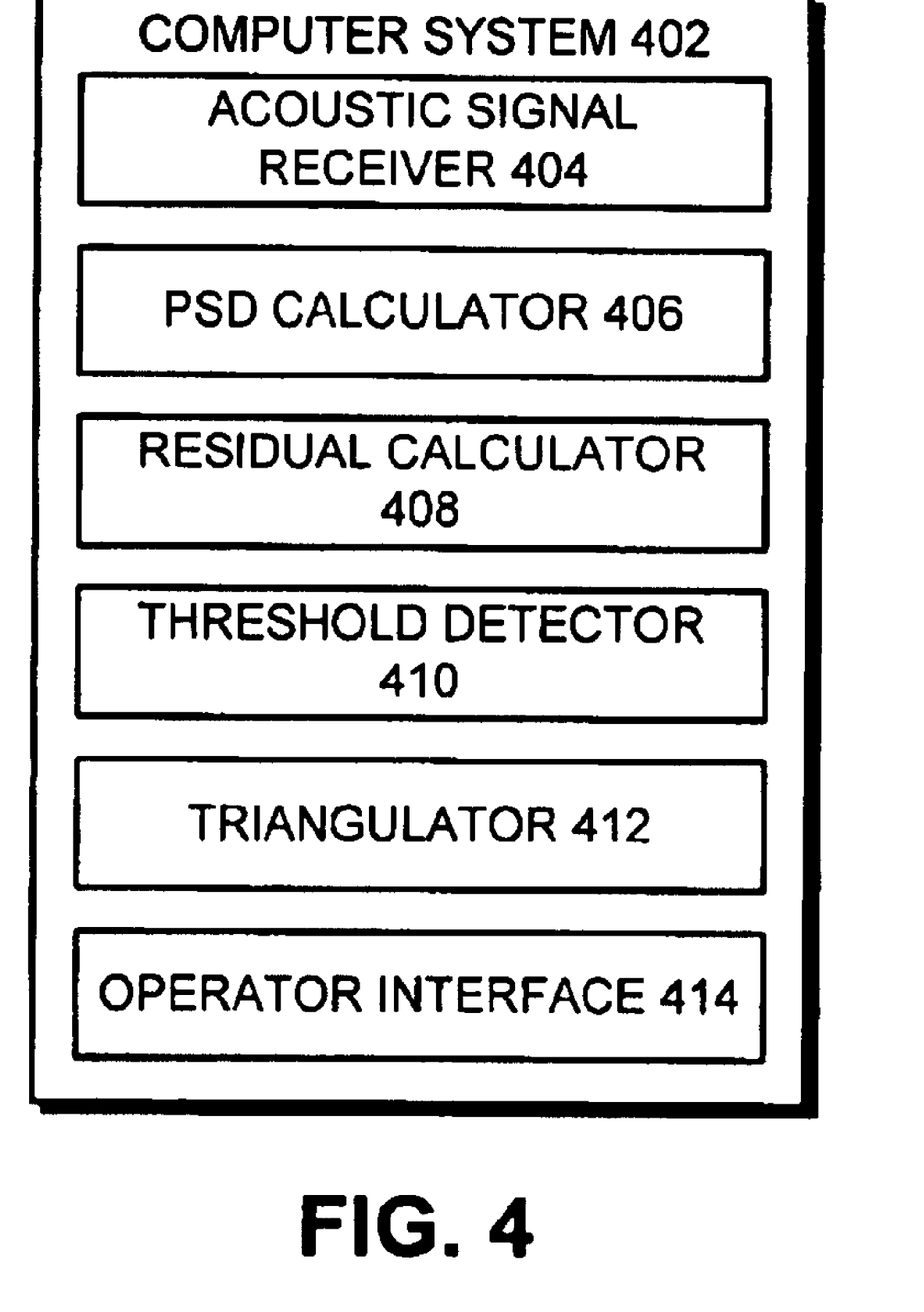
FIG. 4 illustrates a computer system in accordance with an embodiment of the present invention.

FIG. 4 illustrates computer system 402, which is representative of computer systems 102 and 202 and server 304 as described above. Computer system 402 contains a number of components, including acoustic signal receiver 404, PSD calculator 406, residual calculator 408, threshold detector 410, triangulator 412, and operator interface 414.

Acoustic signal receiver 404 receives analog signals from the microphone or microphones within the system. Acoustic signal receiver 404 converts these analog signals into a digital format and can additionally perform signal-conditioning operations. Analog-to-digital sampling and conversion is well known in the art and will not be discussed further herein.

PSD calculator 406 calculates the power spectral density of signals received by acoustic signal receiver 404. These calculations can include performing a Fourier transform on each of the digitized acoustic signals. Note that after the FOURIER TRANSFORM has been performed, wavelengths of interest can be selected for processing. This selection process isolates wavelengths that are associated with disk drive failures. At the same time, it eliminates extraneous frequencies associated with sounds such as human voices and other sounds that are common in data centers. Note that PSD calculator 406 can also calculate a baseline PSD for each microphone by calculating a PSD for good disk drives operating in the system.

Residual calculator 408 calculates a residual for each microphone by subtracting the baseline PSD from the current PSD for each microphone. Residual calculator 408 can additionally calculate another residual for each microphone by subtracting the current PSD from the baseline PSD. These residuals indicate the change in noise level from the baseline PSD and can provide an early indication of impending disk drive failures.

Threshold detector 410 compares the residuals against an established threshold to determine whether a disk drive is failing. Note that the established threshold can include amplitude levels and times. For example, exceeding the threshold by one percent for five seconds may not be critical, but exceeding the threshold by fifty percent for one second or exceeding the threshold by ten percent for an hour might be critical.

In systems with multiple disk drives, triangulator 412 determines which disk drive is failing. In doing so, triangulator 412 can use any known triangulation mechanism, possibly coupled with fuzzy logic, to identify the failing disk drive. Triangulation mechanisms are well known in the art and will not be described further herein.

After determining which disk drive is failing, operator interface 414 notifies the operator that failure of the specific disk drive is likely. Note that notifying the operator can involve notifying an administrator or a repair person, or storing the data in a log file for later retrieval.

Determining a Faulty Disk Drive

Figure 5:
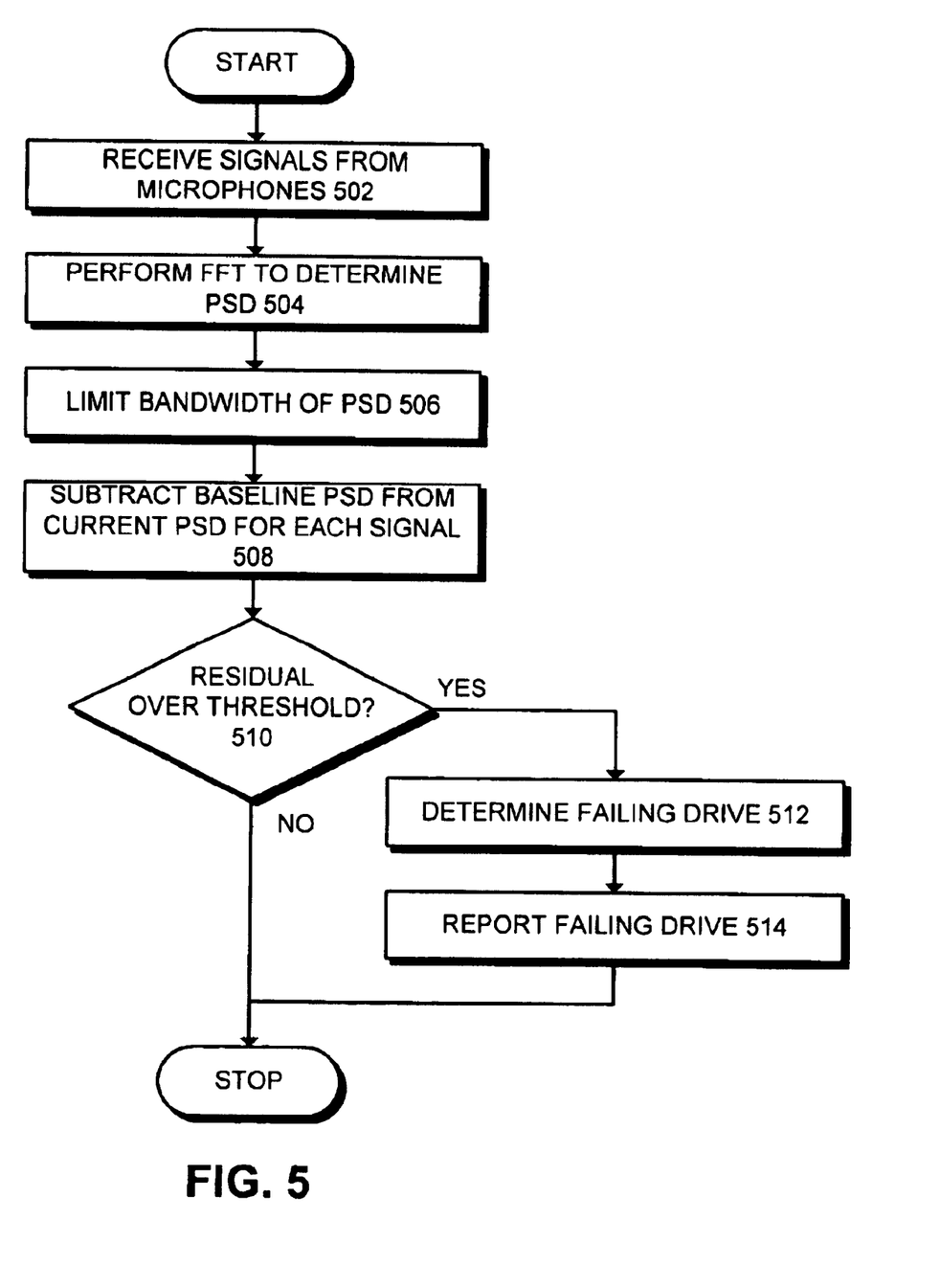
FIG. 5 is a flowchart illustrating the process of determining a faulty disk drive in accordance with an embodiment of the present invention.

FIG. 5 is a flowchart illustrating the process of identifying a faulty disk drive in accordance with an embodiment of the present invention. The system starts when acoustic signal receiver 404 receives signals from the microphones that monitor the disk drives (step 502). Next, PSD calculator 406 performs a Fourier transform on these signals to determine the PSD of the signals (step 504). PSD calculator 406 also isolates a specific bandwidth range within the PSD to allow only frequencies of interest to be examined (step 506).

Residual calculator 408 then subtracts the baseline PSD from the current PSD to determine the residual (step 508). (Note that residual calculator 408 can also determine another residual by subtracting the current PSD from the baseline PSD.) Next, threshold detector 410 determines a residuals is greater than an established threshold (step 510). If a residual is greater than the established threshold, triangulator 412 identifies the failing drive (step 512). Finally, operator interface 414 reports the failing drive (step 514).

Determining a Noise Source

Figure 6:
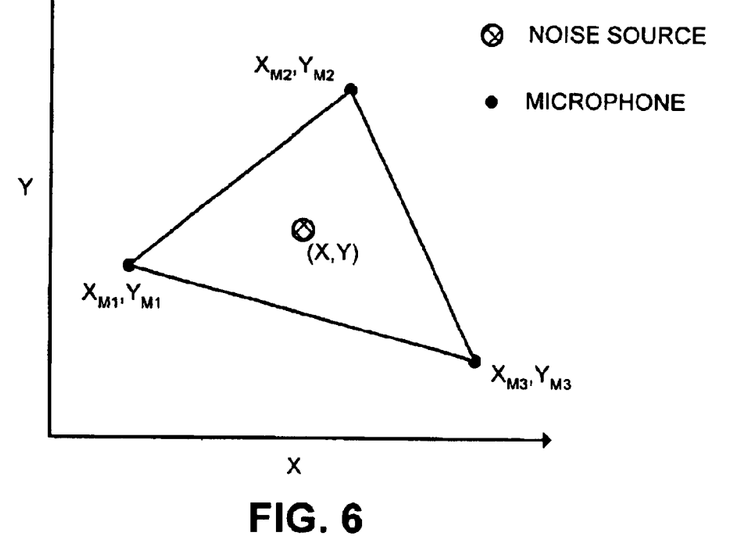
FIG. 6 illustrates the process of determining a noise source in accordance with an embodiment of the present invention.

FIG. 6 illustrates the process of identifying a noise source in accordance with an embodiment of the present invention. As is illustrated in FIG. 6, microphones are located at the periphery of a two-dimensional array of disk drives at fixed coordinates. Note that individual disk drives in the array are not shown in FIG. 6. Only the location of a noise source (X,Y) is shown.

A straightforward triangulation approach is applied to obtain the "apparent locus" (AL) of acoustic energy emission. The AL coordinates, (X,Y), are then compared to the coordinates for each drive in the array. If the AL coincides with the centroid of an individual drive, then a possible single-drive degradation location has been identified. However, at least one subsequent computation is made with a new set of AL coordinates to confirm that the AL still coincides with the centroid of the identified drive. This second computation is necessary to rule out the possibility that two or more drives have actually failed, producing an AL that happens to coincide with a non-degraded drive.

Allowing for the possibility that one or more additional disk drives may begin to degrade before the first drive is removed from the array (a scenario that is quite possible, in view of the fact that drives frequently degrade over a period of days or even weeks), the above localization approach can be subject to faulty localization diagnosis.

To understand why this is so, consider the situation where there are two drives with degraded spindle bearings (a common failure mode) emitting anomalous acoustic spectra within a rectangular array of drives. The above described triangulation technique will localize the anomalous source of the degradation to a "tie-line" connecting the centroids of the two degrading drives. The AL for the anomalous bearing noise could even coincide with the position of an undegraded drive in the array. In this case, rather than mitigating serviceability issues, the above triangulation could potentially exacerbate those issues, by causing a service engineer to replace a good drive, while leaving the two degrading drives in service.

If three drives should develop bearing problems in the same enclosure, then the AL for the anomalous bearing noise will be confined to a triangle whose vertices are the approximate centroids of the three problematic drives. In this case, any other (unfailing) drives within this triangle could be misidentified as being degraded. These problems can be addressed by applying a barycentric coordinate technique as is described below with reference to FIG. 7.

Barycentric Coordinate Technique

Figure 7:
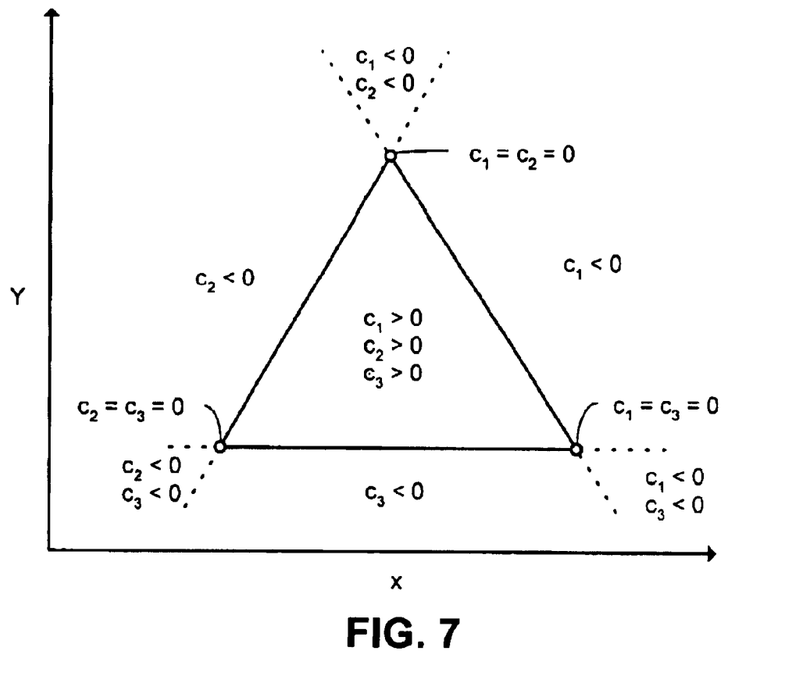
FIG. 7 illustrates a barycentric coordinate technique in accordance with an embodiment of the present invention.

FIG. 7 illustrates a barycentric coordinate technique in accordance with an embodiment of the present invention. The straightforward mathematical triangulation approach described above is used to obtain the AL of acoustic energy emission. If the AL coordinates do not coincide with the centroid of a drive, or if the AL coordinates move over time, multiple failures are indicated. In this case, the system goes into a multiple-failure search mode using a barycentric coordinate technique (BCT) to quickly and efficiently identify all possible pairs of drives and triples of drives that could have produced the AL.

There will typically be multiple feasible pairs and multiple feasible triples. When this is the case, the system performs sequential computations with temporally spaced acoustic spectra. It is known experimentally that the AL does not stay in a fixed position with multiple failures. A fixed position would be possible only if the sounds emitted from the two or more degrading drives had emission spectra that were either perfectly constant with time, or increased and decreased in amplitude exactly in unison. This scenario is considered extremely unlikely.

In order to employ the BCT, the system first expresses the component-node coordinates as linear weighting functions using a system of barycentric coordinates. To define such a system, the goal is to choose three weighting functions (C1, C2, and C3) to describe the coordinates of any point N that falls inside, outside, or on the edge of a triangle formed by three of the component-nodes. Note that these component-nodes can be the location of the suspected failing disk drives. During the process of locating the failing drive or drives, multiple triples of disk drives within the array are tried. Referring to FIG. 3, a candidate set of three drives (shown in bold lines) has been selected. The Cartesian coordinates of point N are (x, y) which are related to the barycentric coordinates by Equation (1):

$$x = c_1 x_1 + c_2 x_2 + c_3 x_3,$$

$$y = c_1 y_1 + c_2 y_2 + c_3 y_3$$

The coordinates $c_1$, $c_2$, and $c_3$ represent the weighting functions relating the coordinates of the three component nodes to the coordinates of any point in the plane. The value of $c_i$ should be one at node i, and zero at the other two nodes. Thus a requirement of the system is that the weighting functions sum to one (Equation 2):

$$c_1 + c_2 + c_3 = 1$$

Equation (2) shows that only two of the barycentric coordinates can be independent. Equations (1) and (2) in their matrix form result in Equations (3) and (4):

$$\begin{pmatrix} x_1 & x_2 & x_3 \\ y_1 & y_2 & y_3 \\ 1 & 1 & 1 \end{pmatrix} C_3 = \begin{pmatrix} x \\ y \\ 1 \end{pmatrix}$$

where $$C_3 = \begin{pmatrix} c_1 \\ c_2 \\ c_3 \end{pmatrix}$$

The power and simplicity of the BCT is evident in Equation (3). The $C_3$ vector contains unique properties, and can be determined by the trivial inversion of Equation (3). FIG. 7 illustrates graphically the properties of the components of $C_3$ and the relation between the Cartesian-coordinate system and the barycentric coordinate system. If the AL is located at $c_1$, the values of $c_2$ and $c_3$ will be zero. Likewise, if the AL is located within the triangle formed by the three selected disk drives, the values of $c_1$, $c_2$, and $c_3$ will each be greater than zero. Thus, it is a matter of selecting various combinations of disk drives from the two-dimensional array, observing $C_3$ for each combination, and determining the failing drives from these results.

The BCT method described above can be extended to a three-dimensional array of disk drives by adding a fourth microphone in a non co-planar position with respect to the first three microphones and with the three-dimensional array of disk drives. The extensions for the mathematics are straightforward and will not be described further herein. Note that while this description relates only to disk drives, the technique can be extended to any array of mechanical devices, such as fan trays in computer systems.

Determining Disk Drives Likely to Fail

Figure 8:
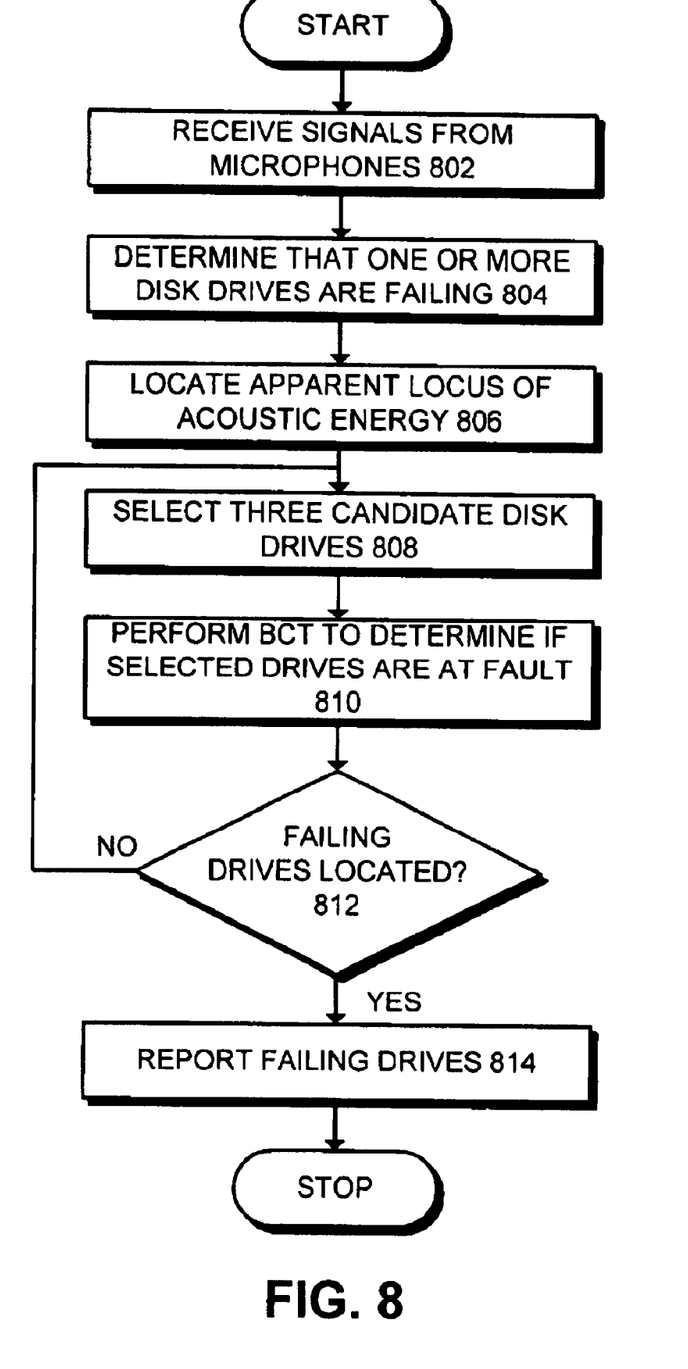
FIG. 8 presents a flowchart illustrating the process of determining disk drives that are likely to fail in accordance with an embodiment of the present invention.

FIG. 8 is a flowchart illustrating the process of identifying disk drives that are likely to fail in accordance with an embodiment of the present invention. The system starts when acoustic signal receiver 404 receives signals from microphones 332, 334, and 336 (step 802). Next, computer system 402 determines that one or more disk drives are failing as described above in conjunction with FIG. 3 (step 804). Triangulator 412 then locates the apparent locus (AL) of the acoustic energy (step 806).

Next, triangulator 412 selects three candidate disk drives (step 808). Triangulator 412 then performs a barycentric coordinate technique (BCT) as described above to determine if the selected drives are at fault (step 810). Note that the procedure must be applied at least twice with different drives selected to ensure that the indicated drives are truly faulty as explained above.

Next, triangulator 412 determines if the failing drive or drives have been located (step 812). If not, the process returns to step 808 to select another set of candidates for BCT processing. If the failing drive or drives have been located at step 812, operator interface 414 reports the failing drives to an operator (step 814).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining whether a disk drive is likely to fail, comprising:

monitoring at least three acoustic signals emitted from a two-dimensional array of disk drives;

comparing characteristics of each acoustic signal with baseline acoustic signals, wherein the baseline acoustic signals reflect normal operation of the two-dimensional array of disk drives; and if the at least three acoustic signals differ by a predetermined amount from the baseline acoustic signals, identifying one or more disk drives in the two-dimensional array of disk drives that are likely to fail.

2. The method of claim 1, wherein monitoring at least three acoustic signals involves monitoring signals from microphones arranged non-linearly on a periphery of the two-dimensional array of disk drives.

3. The method of claim 1, wherein comparing characteristics of each acoustic signal with baseline acoustic signals involves:

calculating a power spectral density for each acoustic signal; and subtracting a baseline power spectral density from the power spectral density for each acoustic signal.

4. The method of claim 3, wherein calculating the power spectral density involves performing a Fourier transform on each acoustic signal.

5. The method of claim 4, further comprising limiting a frequency range of the power spectral density to a predetermined frequency range associated with failing disk drives.

6. The method of claim 1, wherein identifying that one or more disk drives is likely to fail involves correlating the acoustic signals to determine one or more disk drives within the two-dimensional array of disk drives that may fail.

7. The method of claim 6, wherein correlating the acoustic signals involves localizing failing disk drives by applying a barycentric coordinate technique to the acoustic signals.

8. The method of claim 1, further comprising:

monitoring at least four acoustic signals emitted from a three-dimensional array of disk drives;

comparing characteristics of each acoustic signal with baseline acoustic signals, wherein the baseline acoustic signals reflect normal operation of the three-dimensional array of disk drives; and if the at least four acoustic signals differ by the predetermined amount from the baseline acoustic signals, identifying one or more disk drives in the three-dimensional array of disk drives that are likely to fail.

9. A computer-readable storage medium storing instructions that when executed by a computer cause the computer to perform a method for determining whether a disk drive is likely to fail, the method comprising:

monitoring at least three acoustic signals emitted from a two-dimensional array of disk drives;

comparing characteristics of each acoustic signal with baseline acoustic signals, wherein the baseline acoustic signals reflect normal operation of the two-dimensional array of disk drives; and if the at least three acoustic signals differ by a predetermined amount from the baseline acoustic signals, identifying one or more disk drives in the two-dimensional array of disk drives that are likely to fail.

10. The computer-readable storage medium of claim 9, wherein monitoring at least three acoustic signals involves monitoring signals from microphones arranged non-linearly on a periphery of the two-dimensional array of disk drives.

11. The computer-readable storage medium of claim 9, wherein comparing characteristics of each acoustic signal with baseline acoustic signals involves:

calculating a power spectral density for each acoustic signal; and subtracting a baseline power spectral density from the power spectral density for each acoustic signal.

12. The computer-readable storage medium of claim 11, wherein calculating the power spectral density involves performing a Fourier transform on each acoustic signal.

13. The computer-readable storage medium of claim 12, the method comprising limiting a frequency range of the power spectral density to a predetermined frequency range associated with failing disk drives.

14. The computer-readable storage medium of claim 9, wherein identifying that one or more disk drives is likely to fail involves correlating the acoustic signals to determine one or more disk drives within the two-dimensional array of disk drives that may fail.

15. The computer-readable storage medium of claim 14, wherein correlating the acoustic signals involves localizing failing disk drives by applying a barycentric coordinate technique to the acoustic signals.

16. The computer-readable storage medium of claim 9, the method further comprising:

monitoring at least four acoustic signals emitted from a three-dimensional array of disk drives;

comparing characteristics of each acoustic signal with baseline acoustic signals, wherein the baseline acoustic signals reflect normal operation of the three-dimensional array of disk drives; and if the at least four acoustic signals differ by the predetermined amount from the baseline acoustic signals, identifying one or more disk drives in the three-dimensional array that are likely to fail.

17. An apparatus for determining whether a disk drive is likely to fail, comprising:

a monitoring mechanism configured to monitor at least three acoustic signals emitted from a two-dimensional array of disk drives;

a comparing mechanism configured to compare characteristics of each acoustic signal with baseline acoustic signals, wherein the baseline acoustic signals reflect normal operation of the two-dimensional array of disk drives; and an identifying mechanism configured to identify one or more disk drives in the two-dimensional array of disk drives that are likely to fail if the at least three acoustic signals differ by a predetermined amount from the baseline acoustic signals.

18. The apparatus of claim 17, wherein the monitoring mechanism is configured to monitor signals from microphones arranged non-linearly on a periphery of the two-dimensional array of disk drives.

19. The apparatus of claim 17, further comprising:

a calculating mechanism configured to calculate a power spectral density for each acoustic signal; and a subtracting mechanism configured to subtract a baseline power spectral density from the power spectral density for each acoustic signal to compare characteristics of each acoustic signal with baseline acoustic signals.

20. The apparatus of claim 19, wherein calculating the power spectral density involves performing a Fourier transform on each acoustic signal.

21. The apparatus of claim 20, further comprising a limiting mechanism configured to limit a frequency range of the power spectral density to a predetermined frequency range associated with failing disk drives.

22. The apparatus of claim 17, further comprising a correlating mechanism configured to correlate the acoustic signals to determine one or more disk drives within the two-dimensional array of disk drives that may fail.

23. The apparatus of claim 22, wherein the correlating mechanism is configured to localize failing disk drives by applying a barycentric coordinate technique to the acoustic signals.

24. The apparatus of claim 17, wherein:

the monitoring mechanism is further configured to monitor at least four acoustic signals emitted from a three-dimensional array of disk drives;

the comparing mechanism is further configured to compare characteristics of each acoustic signal with baseline acoustic signals, wherein the baseline acoustic signals reflect normal operation of the three-dimensional array of disk drives; and the identifying mechanism is further configured to identify one or more disk drives in the three-dimensional array of disk drives that are likely to fail if the at least four acoustic signals differ by the predetermined amount from the baseline acoustic signals.

* * * * *